United States Patent
Kusayanagi et al.

(10) Patent No.: US 11,841,980 B2
(45) Date of Patent: Dec. 12, 2023

(54) INFORMATION OUTPUT DEVICE AND METHOD OF CONTROLLING INFORMATION OUTPUT BASED ON VEHICLE OCCUPANCY

(71) Applicants: Nissan Motor Co., Ltd., Yokohama (JP); RENAULT S.A.S., Boulogne-Billancourt (FR)

(72) Inventors: Yoshinori Kusayanagi, Kanagawa (JP); Takura Yanagi, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/005,366

(22) PCT Filed: Aug. 11, 2021

(86) PCT No.: PCT/IB2021/000531
§ 371 (c)(1),
(2) Date: Jan. 13, 2023

(87) PCT Pub. No.: WO2022/053862
PCT Pub. Date: Mar. 17, 2022

(65) Prior Publication Data
US 2023/0267233 A1  Aug. 24, 2023

(30) Foreign Application Priority Data
Sep. 10, 2020  (JP) ................................. 2020-152214

(51) Int. Cl.
*G06F 21/32* (2013.01)
*G06F 21/62* (2013.01)
(Continued)

(52) U.S. Cl.
CPC ............ *G06F 21/629* (2013.01); *G06V 20/44* (2022.01); *G06V 40/172* (2022.01); *G06V 20/56* (2022.01);
(Continued)

(58) Field of Classification Search
CPC .... G06F 21/629; G06V 20/44; G06V 40/172; G06V 20/56; G06V 20/59; G10L 15/1815; G10L 15/22
See application file for complete search history.

(56) References Cited

U.S. PATENT DOCUMENTS 10,569,652 B2 *  2/2020  Akachi ................. G08G 1/0962
2005/0001714 A1 *  1/2005  Amari .................... B60K 37/02
340/425.5
(Continued)

FOREIGN PATENT DOCUMENTS

| CN | 109565564 A | 4/2019 |
|----|-------------|--------|
| JP | 2004-147037 A | 5/2004 |

(Continued)

OTHER PUBLICATIONS

Extended European Search Report dated Oct. 5, 2023 of corresponding European Patent Application No. 21866151.0.

*Primary Examiner* — Jeffrey C Pwu
*Assistant Examiner* — William A Corum, Jr.
(74) *Attorney, Agent, or Firm* — Global IP Counselors, LLP

(57) ABSTRACT

An information output device includes: an event detection unit that detects an event occurring inside or outside a vehicle; a member identification unit that identifies a person or persons who can perceive the event as a first member; an event storage unit that stores event data related to the detected event in association with the first members; and a data output unit that automatically outputs the event data
(Continued)

stored in the event storage unit. The member identification unit identifies a person or persons who can view the event data outputted from the data output unit as a second member. The information output device further comprises an output control unit that determines whether the second members include persons other than the first members, and that prohibits the data output unit from automatically outputting the event data upon determining the second members include persons other than the first members.

10 Claims, 10 Drawing Sheets

(51) Int. Cl.
*G06V 40/16* (2022.01)
*G06V 20/40* (2022.01)
G06V 20/59 (2022.01)
G06V 20/56 (2022.01)
G10L 15/18 (2013.01)
G10L 15/22 (2006.01)

(52) U.S. Cl.
CPC .......... *G06V 20/59* (2022.01); *G10L 15/1815* (2013.01); *G10L 15/22* (2013.01)

(56) References Cited

U.S. PATENT DOCUMENTS

| | | | |
|---|---|---|---|
| 2013/0030645 A1* | 1/2013 | Divine | B60K 35/00 709/217 |
| 2013/0116012 A1* | 5/2013 | Okayasu | H04M 1/6091 455/566 |
| 2017/0251163 A1 | 8/2017 | Ochiai et al. | |
| 2019/0327590 A1 | 10/2019 | Kubo et al. | |
| 2021/0370879 A1* | 12/2021 | Julian | H04L 67/06 |

FOREIGN PATENT DOCUMENTS

| | | |
|---|---|---|
| JP | 2012-105174 A | 5/2012 |
| JP | 5478462 B2 | 4/2014 |
| JP | 2018-169942 A | 11/2018 |
| JP | 2019-009498 A | 1/2019 |
| JP | 2019-191828 A | 10/2019 |
| WO | 2020/129182 A1 | 6/2020 |

* cited by examiner

INFORMATION OUTPUT DEVICE AND METHOD OF CONTROLLING INFORMATION OUTPUT BASED ON VEHICLE OCCUPANCY

CROSS-REFERENCE TO RELATED APPLICATIONS

This application is a U.S. national stage application of International Application No. PCT/IB2021/000531, filed on Aug. 11, 2021. This application claims priority to Japanese Patent Application No. 2020-152214, filed on Sep. 10, 2020. The entire contents of Japanese Patent Application No. 2020-152214 are incorporated herein by reference.

BACKGROUND

Technical Field

The present invention relates to an information output device and an information output method.

Background Information

An image/audio recording/playback device that automatically acquires audio and video data (AV data) in a vehicle, acquires and records various types of information, such as that pertaining to the date and time, destination, travel route, and passenger information when the AV data were acquired, and plays back the recorded AV data in the vehicle is known from the prior art (see Japanese Patent No. 5478462—Patent Document 1). In the invention disclosed in Patent Document 1, the acquired AV data are recorded in association with the above-mentioned various types of information, so that when conditions based on various types of information are specified by a user, AV data that correspond to these conditions can be easily extracted and played back.

SUMMARY

However, the image/audio recording/playback device disclosed in Patent Document 1 does not take into consideration who will view the AV data when the recorded AV data is played back. For this reason, in the case that the recorded AV data contain a user's private information that the user does not want to be disclosed to other persons besides the passengers who were in the vehicle when the AV data were recorded, there is the possibility that the user's private information will be divulged to these other people by playing back the AV data.

Given the problems described above, an object of the present invention is to provide an information output device and an information output method that automatically output event data while protecting user private information that is contained in the event data.

An information output device according to one aspect of the present invention comprises an event detection unit, a member identification unit, an event storage unit, and a data output unit, and further comprises an output control unit. When the event detection unit detects an event occurring inside or outside a vehicle, the member identification unit identifies a person or persons who can perceive the event as a first member, and the event storage unit stores the event data related to the detected event associated with the first members. The member identification unit identifies a person or persons that can view the event data as a second member. The output control unit determines whether the second members include persons other than the first members and prohibits the automatic output of the event data upon determining that the second members include persons other than the first members.

By the present invention, it is possible to automatically output event data while protecting user private information that is included in the event data.

BRIEF DESCRIPTION OF THE DRAWINGS

Referring now to the attached drawings which form a part of this original disclosure.

DETAILED DESCRIPTION

Figure 1:
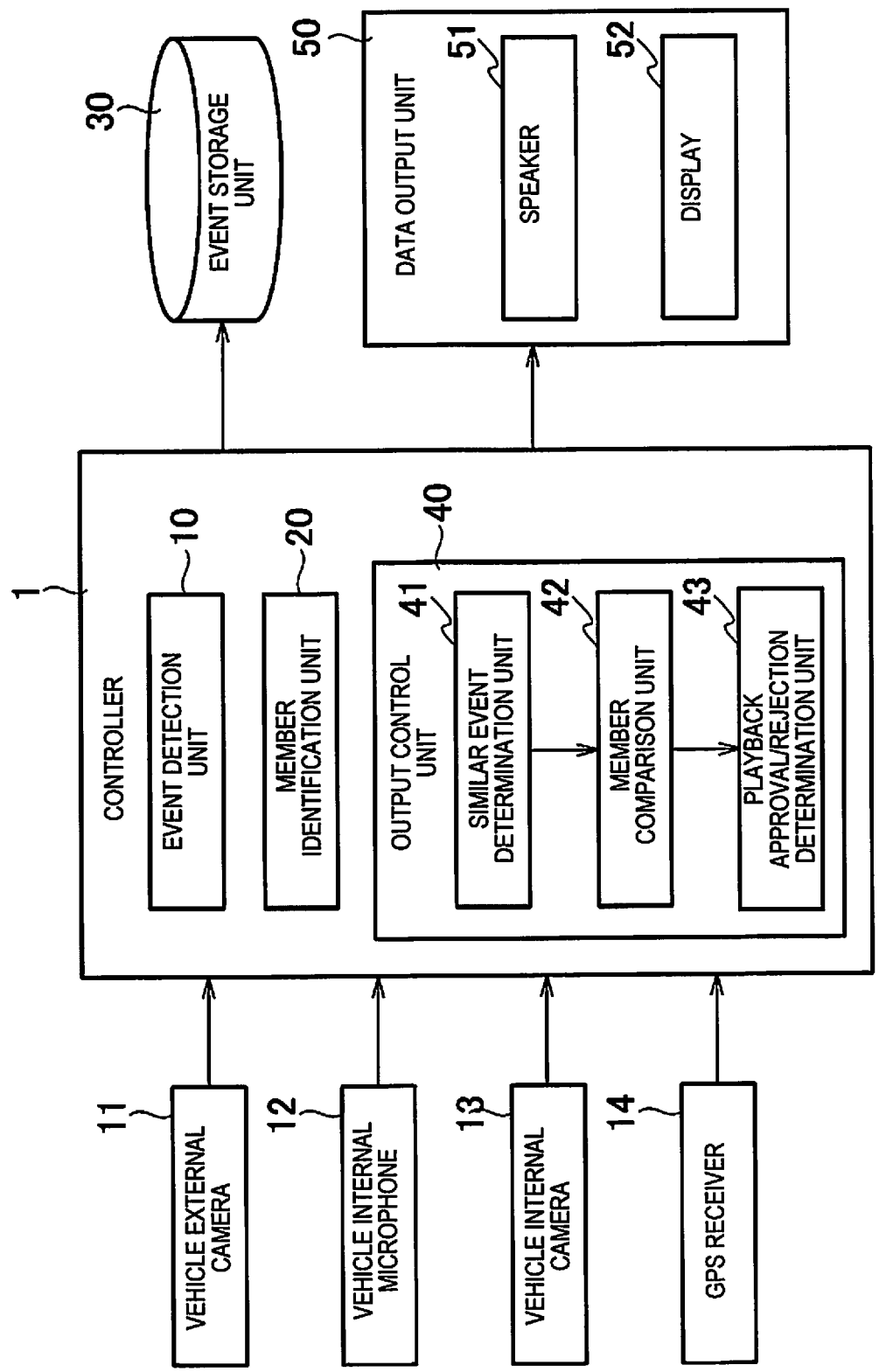
FIG. 1 is a block diagram illustrating the configuration of an information output device according to a first embodiment.

Embodiments will be described with reference to the drawings. In the descriptions of the figures, identical parts have been assigned the same reference numerals, and their descriptions have been omitted.

First Embodiment

An overall configuration of the information output device according to the present embodiment will be described with reference to FIG. 1. The information output device automatically outputs event data while protecting user privacy by prohibiting the automatic output of event data when second members, who are persons who can view the event data that are to be output, include persons other than the persons (first members) who can perceive the event that has occurred inside or outside a vehicle when the event was detected.

The information output device consists primarily of a controller 1. The information output device also includes a camera 11 that photographs the area outside of the vehicle, a microphone 12 provided inside the vehicle, a camera 13 that photographs the interior of the vehicle, a GPS receiver 14, an event storage unit 30, and a data output unit 50.

The controller 1 is a general-purpose microcomputer comprising a CPU (central processing device), memory, and an input/output unit. A computer program is installed in the microcomputer, so that the microcomputer functions as the information output device. By executing the computer program, the microcomputer functions as a plurality of information processing circuits included in the information output device. In the present embodiment, an example is shown in which the plurality of information processing circuits included in the information output device is realized in software, but the information processing circuits can, of course, be realized in dedicated hardware for executing each of the information processes shown below. Further, the plurality of information processing circuits may be realized in discrete hardware.

The controller 1 comprises an event detection unit 10, a member identification unit 20, and an output control unit 40 as the plurality of information processing circuits.

The event detection unit 10 acquires data output from the camera 11, the microphone 12, the camera 13, and the GPS receiver 14 and detects an event that has occurred inside or outside the vehicle. The event detection unit 10 detects the occurrence of an event that becomes a memory of a person (first member) that can perceive the event. A first members includes an occupant of the vehicle.

The camera 11 is located inside or outside of the vehicle cabin, and a plurality thereof are provided at the front, sides, and rear of the vehicle. The cameras 11 capture images of the vehicle surroundings and outputs the images as video data from the outside of the vehicle. The cameras 11 may utilize stereo cameras and monocular cameras used in autonomous driving systems and driving assistance systems.

The microphone 12 is located in the vehicle cabin and collects the voices of persons in the vehicle, which are output as audio data from the inside of the vehicle.

The camera 13 is located inside the vehicle cabin, captures images of persons in the vehicle, especially their faces, and outputs the images as video data from the inside of the vehicle.

The GPS receiver 14 is installed inside the vehicle and outputs the vehicle's ground position information (including latitude and longitude information) by receiving radio waves from a satellite. The GPS receiver 14 can be one used for navigation functions. In the embodiment, the GPS receiver 14 is installed inside the vehicle, but may be installed together with an antenna for communicating with other communication devices or with a radio antenna outside of the vehicle.

The event detection unit 10 detects events that occur inside or outside the vehicle based on audio data and video data from the inside of the vehicle output from the microphone 12 and the camera 13, video data from the outside of the vehicle output from the camera 11, and location information of the vehicle detected by the GPS receiver. An event recorder, for example, is a device that has a function similar to that of the event detection unit. An event recorder is installed in a vehicle and determines whether a traffic accident (event) has occurred based on operating status of devices installed in the vehicle. A method with which the event detection unit 10 detects an event that has occurred will be specifically described below.

The event detection unit 10 analyzes audio data in the vehicle output from the microphone 12 and determines that an event has been detected when it is determined that the conversation of the members in the vehicle has become lively. Specifically, the event detection unit 10 is able to identify the conversation of the members in the vehicle by means of a voice recognition function. As a result, the event detection unit 10 is able to determine if the conversation of the members in the vehicle includes predesignated topics for evaluating whether the conversation is lively and to calculate the rate of occurrence of these topics during conversation. When it is determined that the conversation of the members in the vehicle includes a predesignated topic for determining whether the conversation is lively and that the rate of occurrence of said topic during the conversation is high, the event detection unit 10 determines that the conversation of the members in the vehicle is lively and that an event has been detected. Examples of predesignated topics for determining that the conversation is lively include the weather, views, and tourist attractions. Further, the event detection unit 10 may determine that the conversation of the members inside the vehicle is lively and that an event has been detected when it is detected from the audio data from the inside of the vehicle that the volume of the conversation of the members in the vehicle has increased.

The event detection unit 10 analyzes the video data from the outside of the vehicle output from the camera 11 and the video data from the inside of the vehicle output from the camera 13 and determines that an event has been detected when it is determined that members in the vehicle are responding to a view that can be seen from the vehicle. More specifically, first the event detection unit 10 determines whether a view similar to predesignated views, which include those of the ocean, mountains, rivers, sunsets, sunrises, and fireworks, has been detected from the video data from the outside of the vehicle output from the camera 11. Next, when it is detected that a view similar to a predesignated view has been detected, the event detection unit 10 analyzes the video data from the inside of the vehicle output from the camera 13 and determines whether a member in the vehicle is responding to the detected view. A facial recognition function for identifying a person from the video data and that identifies the direction in which the identified person's head is turned can be used as the means for determining whether a member in the vehicle is responding to the detected view. The event detection unit 10 can thus determine whether each person in the vehicle is facing the direction of the detected view, and, if at least a certain percentage is facing the direction of the view, determine that the members in the vehicle are responding to the detected view. The event detection unit 10 can thereby determine whether members in the vehicle are responding to the detected view and to determine that an event has been detected.

When the location information of the vehicle detected by the GPS receiver 14 is acquired and it is determined that the current location of the vehicle is near a well-known tourist attraction, the event detection unit 10 determines that an event has been detected.

Further, the event detection unit 10 acquires, in addition to the vehicle's location information detected by the GPS receiver 14, date and time information received by the GPS receiver 14, and identifies the vehicle location and the date and time when it was determined that an event had been detected. The date and time when it was determined that an event had been detected can be accurately identified by using the date and time information received by the GPS receiver 14.

When the event detection unit 10 detects an event, the member identification unit 20 acquires the audio data from the inside of the vehicle output from the microphone 12 and the video data from the inside of the vehicle output from the camera 13. By analyzing the acquired audio data from the inside of the vehicle and video data from the inside of the vehicle, the member identification unit 20 identifies first members, who are persons that are in the vehicle and that can perceive the event. Specifically, the member identification unit 20 is able to identify a person in the vehicle by means of a speaker identification function that extracts, from the audio data from the inside of the vehicle output from the microphone 12, acoustic features of voices, which differ from person to person, and that identify the voices based on the extracted acoustic features.

The member identification unit 20 also acquires the video data output from the camera 13. The member identification unit 20 is equipped with a facial recognition function that detects the face of each person from the video data and identifies the face of each person from the relative positions and sizes of the detected facial parts and the morphological characteristics of the eyes, nose, and chin, and in this way identifies each person in the vehicle. The member identification unit 20 may also estimate age from the facial features. Further, the facial recognition function is able to detect the orientation of the face, and the degree of opening of the eyes and mouth of each identified person. The member identification unit 20 can thereby determine whether each of the identified persons is facing the direction of the detected event and whether they are sleeping, and in this way identify first members as those who can perceive the detected event.

The member identification unit 20 may determine whether there is a user of the information output device among the identified first members. The user of the information output device is a person that is preregistered in the information output device as the main user of the information output device. Specifically, the member identification unit 20 can determine whether there is the user of the information output device among the first members based on facial data of the user of the information output device captured by the camera 11 and on audio data of the user of the information output device collected by means of the microphone 12.

The member identification unit 20 also identifies a second member as a person that is in the vehicle and that can view the event data to be output, in the same manner as when a first member was identified. Event data are data relating to a detected event, which include audio and video from the inside and outside of the vehicle acquired by the cameras 11, 13, and microphone 12, when the event detection unit 10 detects the event.

The member identification unit 20 identifies a second member as a person who can view the event data to be output and who can understand the event data to be output. Specifically, the member identification unit 20 is equipped with a facial recognition function for estimating the age of each person who can view the event data to be output. This allows the member identification unit 20 to determine whether the members that can view the event data to be output include children who are not old enough to understand the language and written words included in the event data. By excluding persons who cannot understand the language and written words from among the members that can view the event data to be output, the member identification unit 20 can identify persons who can understand the event data to be output as second members.

The event storage unit 30 consists of an information storage device including a hard disk drive and online storage. The event storage unit 30 stores the location of the vehicle at the time when the event was detected identified by the event detection unit 10, and the time and date, as well as event data including audio and video from the inside and outside of the vehicle acquired by the cameras 11, 13, and microphone 12. The event storage unit 30 stores the event data to be stored in association with the first members identified by the member identification unit 20. Specifically, the event storage unit 30 stores each person of the identified first members and associates the detected event data with each of the stored persons. Alternatively, the event storage unit 30 may store each person of the identified first members in association with the event data.

The output control unit 40 is composed of a similar event determination unit 41, a member comparison unit 42, and a playback approval/rejection determination unit 43, and determines whether the event data stored in the event storage unit 30 can or cannot be output.

When the event detection unit 10 detects another event, the similar event determination unit 41 determines whether the detected other event is another event that is similar to an event stored in the event storage unit 30 as event data. Specifically, it is determined whether at least one of the contents of the conversation of the members in the vehicle, the view that can be seen from the vehicle, and the vehicle location at the time when the event detection unit 10 determined that the event was detected, is similar to the contents of a conversation of members, a view that can be seen from the vehicle, and a vehicle location stored in the event data. For example, the similarity is determined by whether or not the conversation of the members in the vehicle includes a topic of conversation stored in the event data, and whether or not a view that can be seen from the inside of the vehicle includes a part of the views stored in the event data (for example, those of the ocean, mountains, rivers, sunrises, sunsets, and fireworks).

When it is determined by the similar event determination unit 41 that the detected other event is similar to an event stored in the event storage unit 30 as event data, the member comparison unit 42 compares the second members with the first members. Specifically, the member comparison unit 42 extracts the first members stored in association with event data determined to be similar and stored in the event storage unit 30 and compares the extracted first members with the second members identified by the member identification unit 20. The member comparison unit 42 then determines whether the second members include persons other than the first members.

The process of comparing the second members with the first members to determine whether the second members include persons other than the first members need not take place at the time that another event similar to an event data stored in the event storage unit 30 is detected. For example, the member comparison unit 42 may compare the second members with the first members and determine whether the second members include persons other than the first members when second members are identified as persons who are in the vehicle and who can view the event data to be output. Specifically, for each piece of the event data, the member comparison unit 42 extracts first members stored in association with this piece of the event data stored in the event storage unit 30 and compares the first members associated with this piece of the event data with second members identified by the member identification unit 20. In this way, for each piece of event data, it can be determined whether the second members include persons other than the first members associated with each piece of the event data.

If the member comparison unit 42 determines that the second members include persons other than the first members, the playback approval/rejection determination unit 43 prohibits automatic output of the event data.

If the member comparison unit 42 determines that the second members do not include persons other than the first members, the playback approval/rejection determination unit 43 permits automatic output of the event data.

If another event that is similar is detected and the member comparison unit 42 determines that the second members include persons other than the first members and that the second members include at least one person who is a first member, the playback approval/rejection determination unit 43 queries the first member included in the second members regarding whether the event data can be output. If the member identification unit 20 determines that the user of the information output device is a first member included in the second members, the playback approval/rejection determination unit 43 may query the user of the information output device regarding whether the event data can be output.

Specifically, in order to query a first member included in the second members regarding whether the event data can be output, the playback approval/rejection determination unit 43 outputs a message as voice data to a speaker 51 inquiring whether the event data can be output. Alternatively, the playback approval/rejection determination unit 43 outputs a message as text data to a display 52 inquiring whether the event data can be output. The message querying the first member included in the second members regarding whether playback can be performed may be output from either the speaker 51 or the display 52, or together from both the speaker 51 and the display 52.

The playback approval/rejection determination unit 43 acquires the playback approval/rejection response that is collected by the microphone 12. Alternatively, the playback approval/rejection determination unit 43 acquires the playback approval/rejection response input to the display 52 provided in the vehicle. If the acquired response is the response from the first member included in the second members, the playback approval/rejection determination unit 43 determines whether or not the event data can be output based on the response from the first member included in the second members. Whether the acquired response is the response of a first member included in the second members is determined by the member identification unit 20.

Here, the determination made by the output control unit 40 regarding whether the event data can be output will be explained schematically with reference to FIGS. 4A, 4B, and 4C, in which are illustrated the second and first members.

Figure 4A:
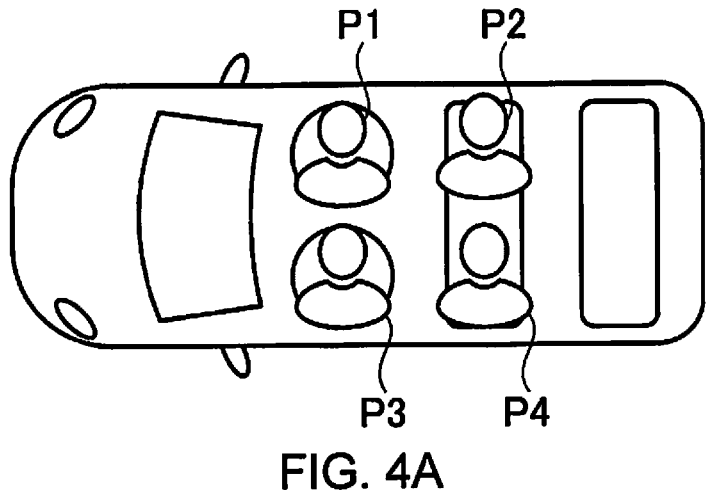
FIG. 4A is a schematized diagram showing a member composition when the information output device according to the first embodiment determines whether or not to output the event data.

FIG. 4A shows a situation in a vehicle when an event has been detected, with person P1, person P2, person P3, and person P4 on board. Person P1, person P2, person P3, and person P4 are first members who were determined to be capable of perceiving the detected event. Person P1 is the user of the information output device. The event data at the time the event was detected are stored in association with person P1, person P2, person P3, and person P4.

Figure 4B:
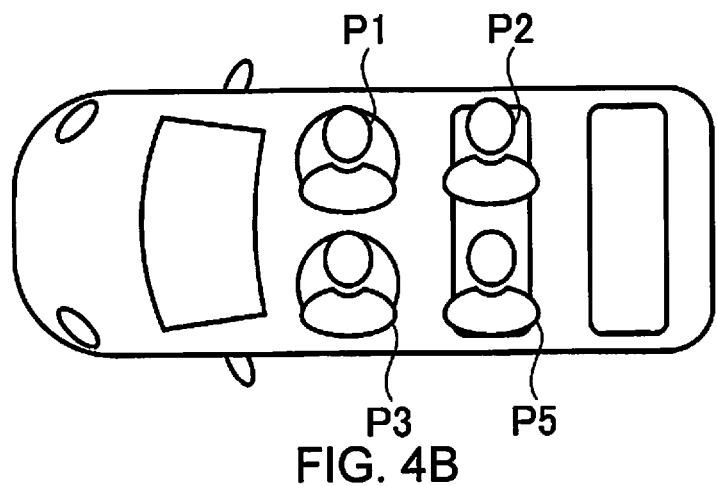
FIG. 4B is a schematized diagram showing a member composition when the information output device according to the first embodiment determines whether or not to output the event data.

FIG. 4B shows an example of a situation in the vehicle at a different time than that of FIG. 4A, with person P1, person P2, person P3, and person P5 on board. Person P1, person P2, person P3, and person P5 are second members who have been determined to be able to view the event data to be output. The member comparison unit 42 extracts the first members stored in association with each piece of event data stored in the event storage unit 30 and, for each piece of event data, compares the first members associated with each piece of the event data with the second members. When the member comparison unit 42 extracts event data stored for the situation shown in FIG. 4A, the second members include the person P5 who is not a first member. Thus, the member comparison unit 42 determines that the second members include a person other than a first member, and the playback approval/rejection determination unit 43 prohibits the automatic output of the event data stored for the situation shown in FIG. 4A.

The playback approval/rejection determination unit 43 may determine whether the event data can be output when other similar events are detected and the detected other events are determined to be similar to the events stored as event data in the event storage unit 30.

The second members shown in FIG. 4B include person P5, who is not among the first members shown in FIG. 4A, but also include person P1, person P2, and person P3, who are first members. Thus, the playback approval/rejection determination unit 43 queries person P1, person P2, and person P3, who are first members included in the second members, regarding whether the event data can be output. Person P1 is a first member and is the user of the information output device. If the first members included in the second members include the user of the information output device, the playback approval/rejection determination unit 43 may query the user of the information output device regarding whether the event data can be output. The playback approval/rejection determination unit 43 then determines whether the event data can be output based on the acquired response from the person who is a first member and who is included among the second members.

Figure 4C:
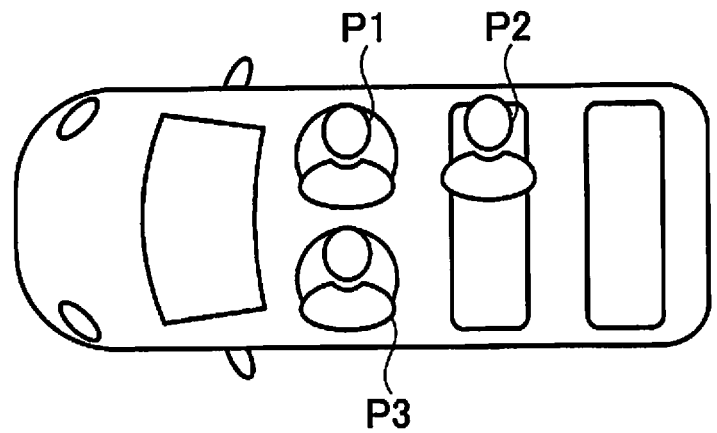
FIG. 4C is a schematized diagram showing a member composition when the information output device according to the first embodiment determines whether or not to output the event data.

FIG. 4C shows another example of a situation in the vehicle at a different time than that of FIG. 4A when the other similar event was detected, with person P1, person P2, and person P3 on board. Person P1, person P2, and person P3 are second members who have been determined to be able to view the event data to be output. If another event similar to the event data stored for the situation shown in FIG. 4A is detected, the member comparison unit 42 compares the second members and the first members. The second members do not include persons other than the first members. Thus, the member comparison unit 42 determines that the second members do not include members other than the first members, and the playback approval/rejection determination unit 43 permits the automatic output of the event data.

As described above, the output control unit 40 can determine whether the second members include persons other than the first members and can determine whether the event data can be output.

Further, the output control unit 40 may extract event data, which contains second member information, from the event data stored in the event storage unit 30 and present the data as a list to a second member.

Specifically, the member comparison unit 42 compares the second members and the first members stored in association with the event data. If the member comparison unit 42 determines that the first members and the second members are the same persons, then the event data associated with the first members are extracted. This allows a second member to be presented with a list of event data in which second member information is stored.

Further, when the list of event data in which second member information relating is stored is presented to the second member, the output control unit 40 may calculate the ratio of the second members to the first members stored in each piece of event data to be presented as a list, and present each piece of event data to the second member in descending order of the ratio.

The data output unit 50 consists of the speaker 51 and the display 52 and is installed in a position in which members in the vehicle can view the data. When the playback approval/rejection determination unit 43 permits output of the event data, the data output unit 50 outputs the audio data stored in the event data from the speaker 51 and outputs the video data stored in the event data from the display 52.

Figure 2:
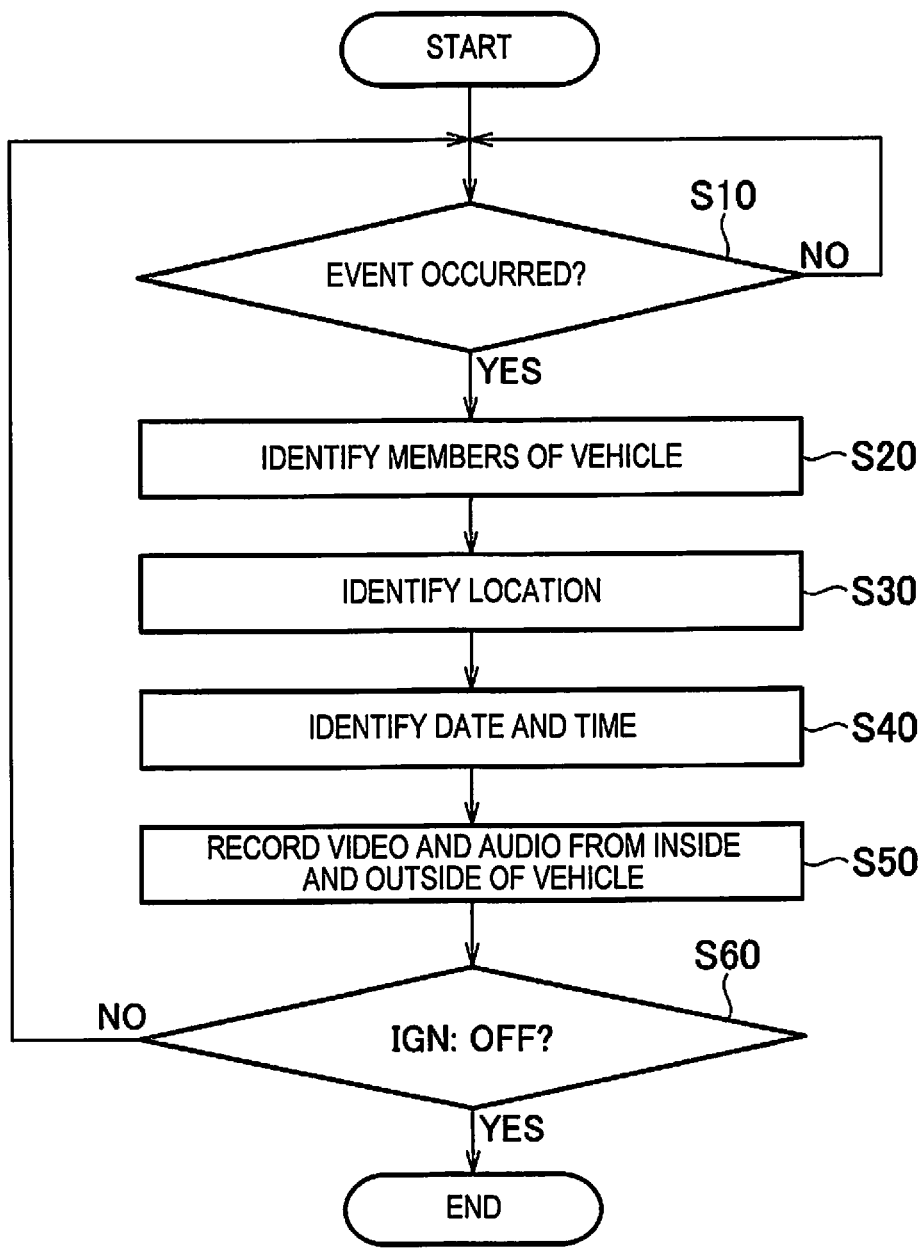
FIG. 2 is a flowchart showing an operation in which the information output device according to the first embodiment stores event data.

A method with which the information output device shown in FIG. 1 stores event data will now be described with reference to FIG. 2. The operation of the information output device shown in the flowchart of FIG. 2 is started when the power of the vehicle is turned ON (IGN: ON), and the process is terminated when it is detected that the power of the vehicle has been turned OFF (IGN: OFF).

In Step S10, the event detection unit 10 determines whether an event that has occurred inside or outside the vehicle has been detected based on audio data and video data from the inside of the vehicle, video data from the outside of the vehicle, and location information of the vehicle detected by the GPS receiver. If it is not determined that an event has been detected (NO in Step S10), the process remains at Step S10 and continually executes the event detection process.

If the event detection unit 10 has determined that an event has been detected (YES in Step S10), the process proceeds to Step S20. In Step S20, the member identification unit 20 analyzes the acquired audio data from the inside of the vehicle and video data from the inside of the vehicle to identify persons who are in the vehicle and who can perceive the event as first members.

Proceeding to Step S30, the event detection unit 10 acquires the location information detected by the GPS receiver 14 and identifies the location of the vehicle at the time that the event was detected. Proceeding to Step S40, the event detection unit 10 acquires the date and time information received by the GPS receiver 14 and identifies the date and time when the event was detected.

Proceeding to Step S50, the event storage unit 30 stores the location of the vehicle at the time the event was detected identified by the event detection unit 10, and the time and date, as well as event data including audio and video data from the inside and outside of the vehicle acquired by the cameras 11, 13, and microphone 12. The event storage unit 30 stores the event data to be stored in association with the first members identified by the member identification unit 20.

Proceeding to Step S60, if a shutdown determination unit (not shown in FIG. 1) provided in the information output device has not detected that the power of the vehicle has been turned OFF (IGN: OFF) (NO in Step S60), the process returns to Step S10 and continues. When the shutdown determination unit determines that the power of the vehicle has been turned OFF (IGN: OFF) (YES in Step S60), the process is terminated.

By executing the process described above, the information output device can store event data related to the event, including audio and video from the inside and outside of the vehicle when the event was detected, in association with first members.

Figure 3:
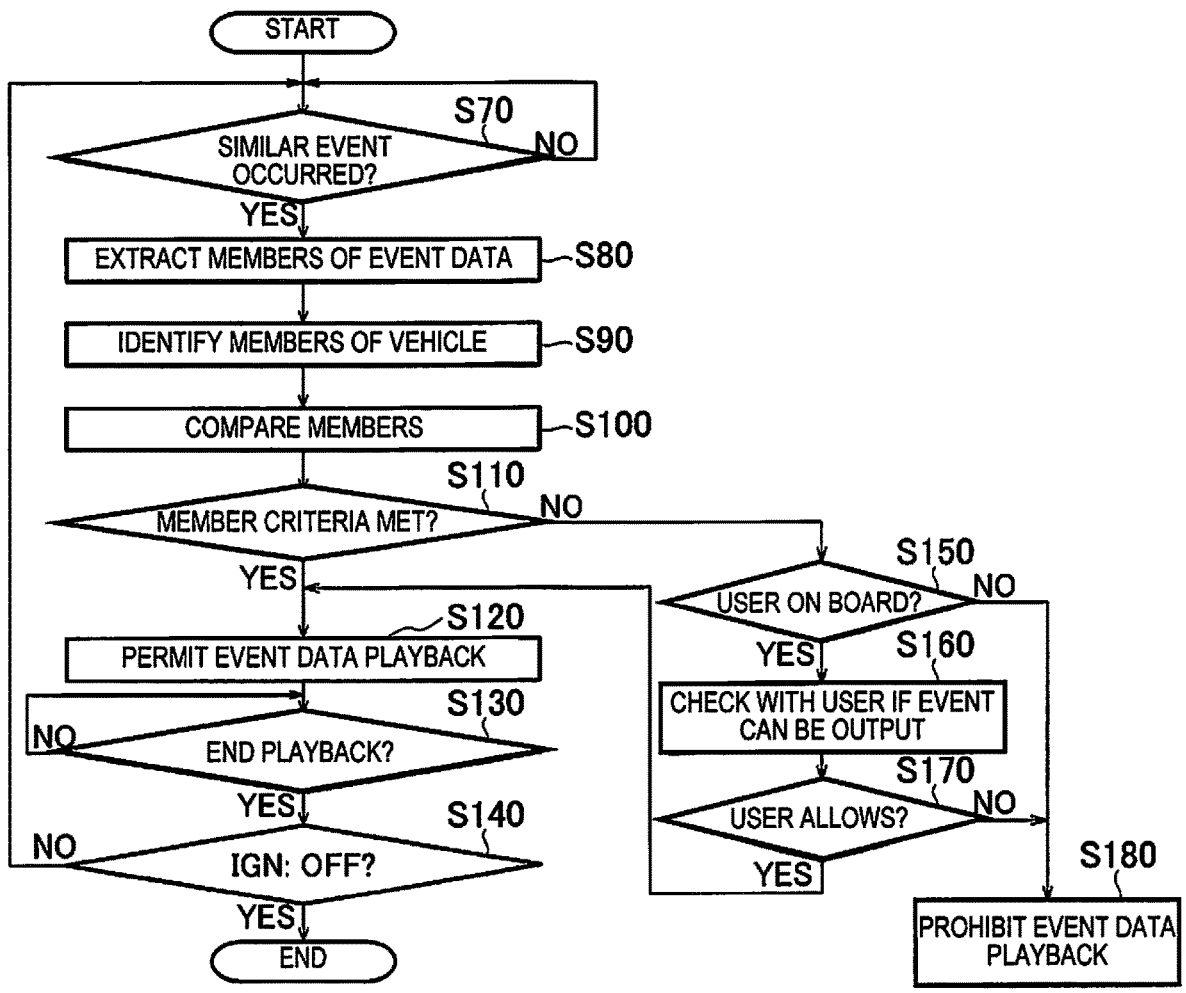
FIG. 3 is a flowchart showing an operation in which the information output device according to the first embodiment outputs event data.

A method with which the information output device shown in FIG. 1 outputs event data will now be described with reference to FIG. 3. The operation of the information output device shown in the flowchart of FIG. 3 is started when the power of the vehicle is turned ON (IGN: ON), and the process is terminated when it is detected that the power of the vehicle has been turned OFF (IGN: OFF).

In Step S70, when the event detection unit 10 detects another event, the similar event determination unit 41 determines whether the detected other event is another event that is similar to an event stored as event data in the event storage unit 30. If the detected event is not another event that is similar (NO in Step S70), the process remains at Step S70 and continually executes the process to determine whether the detected other event is another, similar event.

In Step S70, if it is determined that the detected other event is a similar event (YES in Step S70), the process proceeds to Step S80. In Step S80, the member comparison unit 42 extracts first members stored in association with the event data.

Proceeding to Step S90, the member identification unit 20 identifies a person who can view the event data as a second member.

Proceeding to Step S100, the member comparison unit 42 compares the second members with the first members. Proceeding to Step S110, the member comparison unit 42 determines whether members other than first members are included in the second members. If the member comparison unit 42 determines that the second members include members other than the first members (NO in Step S110), the process proceeds to Step S150. At the time that the process proceeds to Step S150, the playback approval/rejection determination unit 43 prohibits the automatic output of the event data.

In Step S110, if the member comparison unit 42 determines that the second members do not include members other than the first members (YES in Step S110), the process proceeds to Step S120 and the playback approval/rejection determination unit 43 permits the automatic output of the event data.

In Step S150, the member comparison unit 42 determines whether or not the second members include at least one first member or the second members include a first member who is a user of the information output device. If the member comparison unit 42 determines that the second members do not include anyone who is a first member (NO in Step S150), the process proceeds to Step S180 and the playback approval/rejection determination unit 43 prohibits output of the event data.

In Step S150, if the member comparison unit 42 determines that the second members include at least one first member or determines that the second members include a first member who is the user of the information output device (YES in Step S150), the process proceeds to Step S160.

In Step S160, the playback approval/rejection determination unit 43 outputs a message to the speaker 51 or the display 52 querying a first member included in the second members or a first member included in the second members who is a user of the information output device regarding whether or not the event data can be output.

Proceeding to Step S170, the playback approval/rejection determination unit 43 determines whether or not the event data can be output based on the response from the first member included in the second members or the first member included in the second members who is the user of the information output device acquired from the microphone 12 or the display 52 installed in the vehicle. If the playback approval/rejection determination unit 43 determines that the response acquired from the microphone 12 or the display 52 prohibits the output of the event data (NO in Step S170), the process proceeds to Step S180, and the output of the event data is prohibited by the playback approval/rejection determination unit 43.

In Step S170, if the playback approval/rejection determination unit 43 determines that the response acquired from the microphone 12 or the display 52 permits the output of the event data (YES in Step S170), the process proceeds to Step S120, and the output of the event data is permitted by the playback approval/rejection determination unit 43.

Proceeding to Step S130, the playback approval/rejection determination unit 43 determines whether the output of the event data has ended. If the playback approval/rejection determination unit 43 has not determined that the output of the event data has ended (NO in Step S130), the process remains at Step S130, and the process of determining whether the output of the event data has ended is continually executed.

In Step S130, if the playback approval/rejection determination unit 43 determines that the output of the event data has ended (YES in Step S130), the process proceeds to Step S140. In Step S140, if a shutdown determination unit (not shown in FIG. 1) provided in the information output device has not detected that the power of the vehicle has been turned OFF (IGN: OFF) (NO in Step S140), the process returns to Step S70 and the process continues.

The process is terminated when the shutdown determination unit determines that power to the vehicle has been turned OFF (IGN: OFF) (YES in Step S140).

As described above, the following actions and effects can be achieved by means of the first embodiment.

Upon determining that the second member who can view the event data to be output include members other than the first members at the time the event data were detected, the information output device prohibits the output of the event data. It is thus possible to prevent first members' private information from becoming known to members other than the first members at the time that the event data were detected, thereby protecting the first members' private information.

Upon determining that the second members who can view the event data to be output do not include members other than the first members at the time the event data were detected, the information output device permits the output of the event data. It is thus possible to prevent first members' private information from becoming known to members other than the first members at the time that the event data were detected, thereby protecting the first members' private information.

Upon determining that the second members include persons other than the first members and that the second members include at least one member of the first members, and another, similar event is detected, the information output device queries the first members included in the second members regarding whether the event data can be output. This allows the first members included in the second members to decide whether the event data can be output, and if the first members included in the second members think that the users' private information may be disclosed to the second members other than the first members, the event data including the private information of the first members can be output.

The information output device can identify the first members in the vehicle at the time that the event was detected and the second members that are in the vehicle in order to determine whether the event data can be output to the second members in the vehicle.

By identifying a person who can understand the event data to be output as a second member, the information output device can determine whether the event data can be output and exclude persons who cannot understand the event data to be output. This allows the output of event data to second members while protecting the first members' private information.

The information output device extracts event data in which information related to the second member is stored from the event data stored in the event storage unit 30 and presents the data to the second member in the form of a list. This allows the second member to select from the list and output event data in which information related to the second members is stored.

When the information output device presents the event data in which information related to the second member is stored to the second member in the form of a list, the information output device calculates the ratio of the second members to the first members stored in each piece of event data to be presented as a list. The information output device then presents to the second member each piece of the event data in descending order of the ratio of the second members to the first members. This allows the second member to select for output event data that are highly relevant to the second members.

When the event detection unit detects another event similar to an event stored in the event storage unit 30 as event data and it is determined that the second members do not include persons other than the first members, the information output device permits the data output unit 50 to automatically output the event data. This allows the automatic output of the event data to the second member when another event that is similar to an event stored as event data is detected.

Second Embodiment

Figure 5:
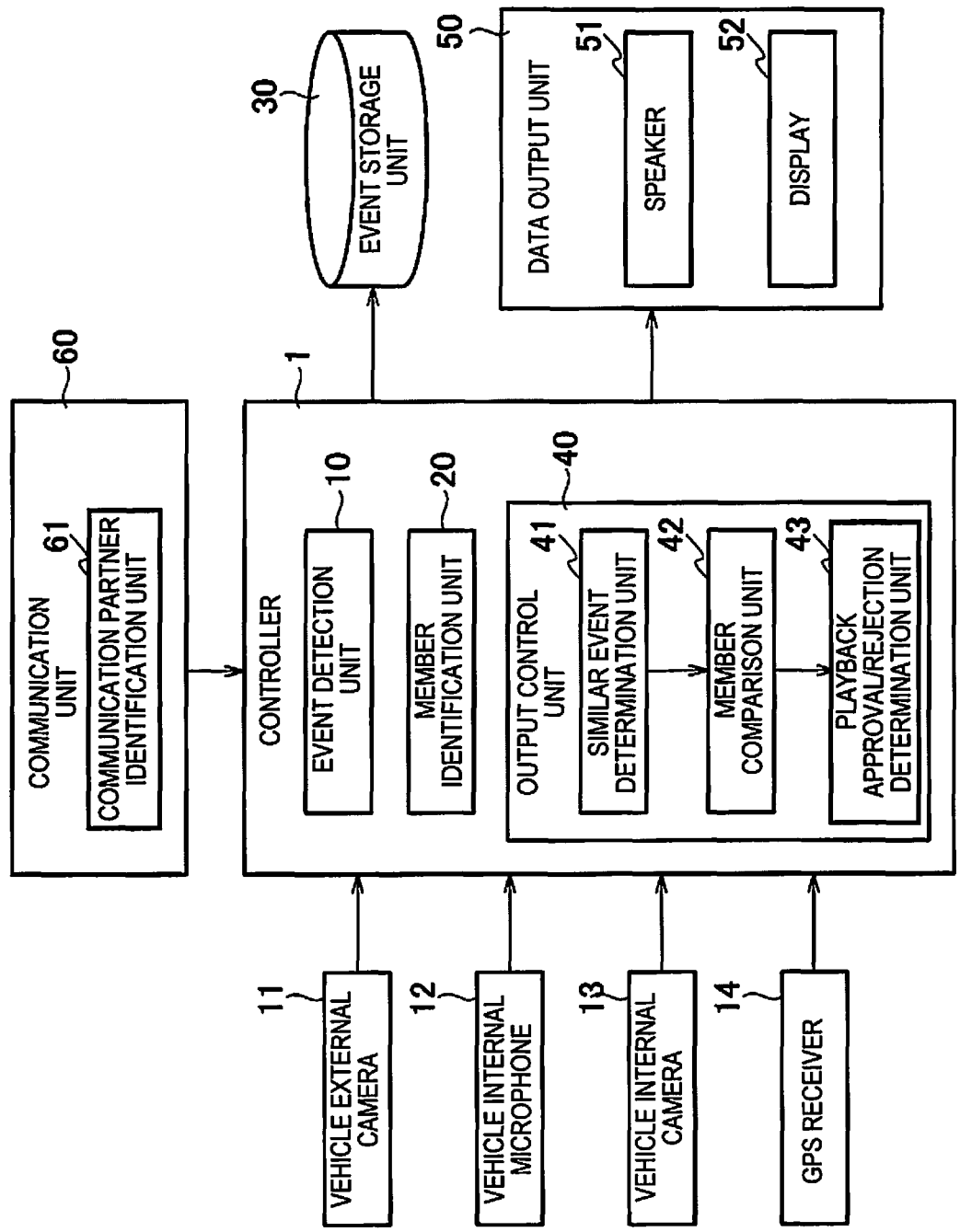
FIG. 5 is a block diagram illustrating the configuration of an information output device according to a second embodiment.

The configuration of the information output device according to a second embodiment will be described with reference to FIG. 5. The only difference from the first embodiment is a communication unit 60. Therefore, only the processing executed by the communication unit 60 will be described, and descriptions of the other, common configurations will be omitted.

In addition to the configuration shown in the first embodiment, the information output device further comprises the communication unit 60 and further identifies first members who were connected to the vehicle via a communication means at the time that an event was detected, and second members who are connected to the vehicle. The communication unit 60 includes a communication partner identification unit 61.

The communication unit 60 transmits to persons connected to the vehicle, via a communication means, audio data and video data from the inside of the vehicle, and video data from the outside of the vehicle. Specific examples of the communication means include cell phones, smartphones, PCs and tablets that can connect to the Internet. These communication devices can play back audio data or video data.

The communication partner identification unit 61 identifies persons connected to the vehicle via a communication means. Persons who can view the audio data and video data from the inside of the vehicle, and video data from the outside of the vehicle via communication means are persons who can perceive an event. Specifically, the communication partner identification unit 61 can identify the telephone number and communication ID of the communication device connected to the vehicle in order to identify the communication partner. The information output device can thus identify persons who were connected to the vehicle via a communication means when the event was detected as first members, and identify persons who are connected to the vehicle as second members.

Figure 6:
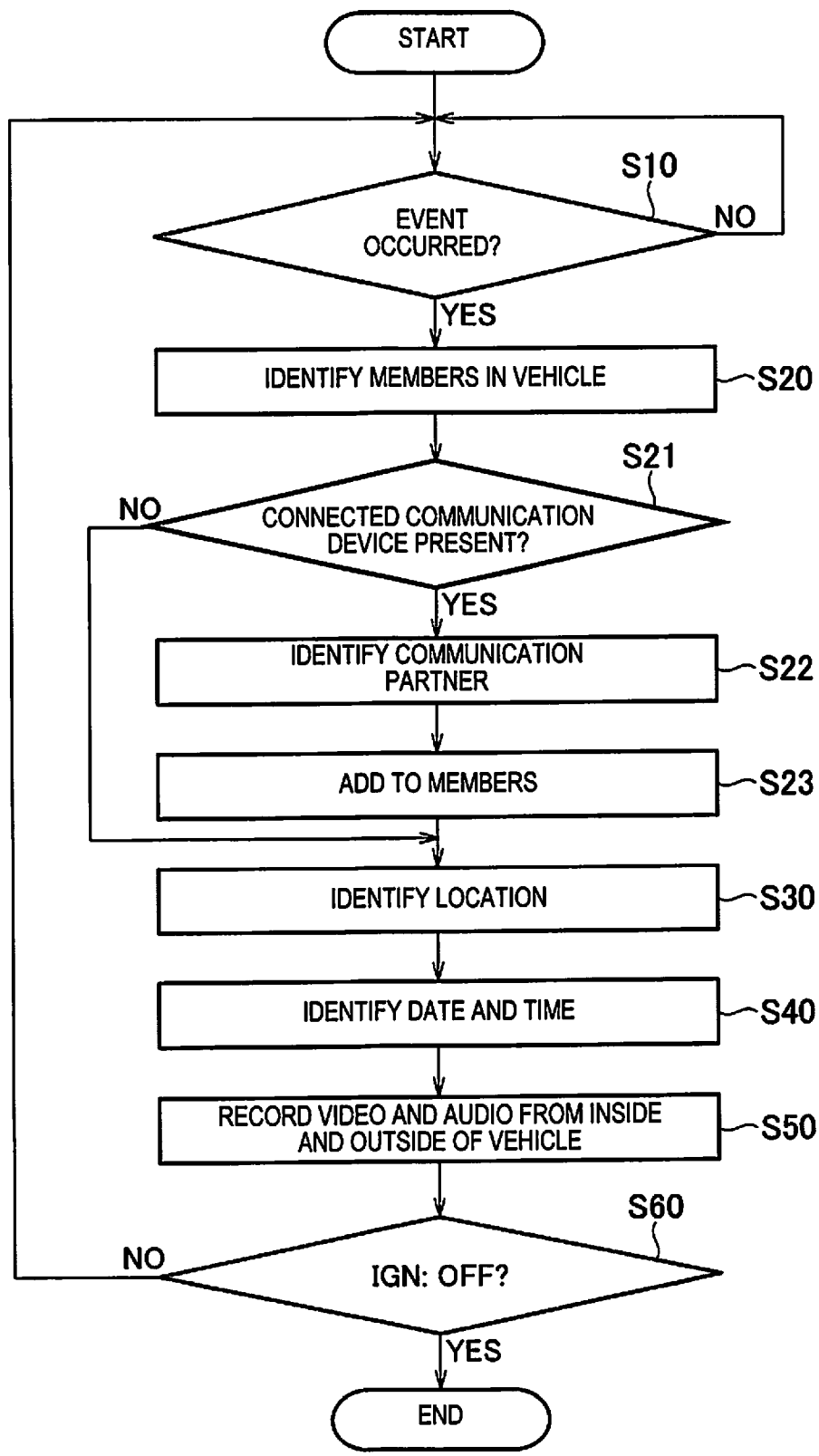
FIG. 6 is a flowchart showing an operation in which the information output device according to the second embodiment stores event data.

A method with which the information output device shown in FIG. 5 stores event data will now be described with reference to FIG. 6. The only difference from the first embodiment is the processing of Steps S21, S22, and S23. Therefore, only the processing steps for this difference will be described, and descriptions of the other, common processes will be omitted.

In Step S21, the communication partner identification unit 61 determines whether or not anyone is connected to the vehicle via a communication means. If the communication partner identification unit 61 determines that no one is connected to the vehicle via a communication means (NO in Step S21), the process proceeds to Step S30.

In Step S21, if the communication partner identification unit 61 determines that someone is connected to the vehicle via a communication means (YES in Step S21), the process proceeds to Step S22.

In Step S22, the communication partner identification unit 61 identifies the person that is connected to the vehicle via a communication means, and the process proceeds to Step S23.

In Step S23, the communication partner identification unit 61 forwards the identity of the identified person to the member identification unit 20. The member identification unit 20 identifies, in addition to the first members that were in the vehicle at the time the event was detected, members who were connected to the vehicle via a communication device at the time the event was detected as first members.

Figure 7:
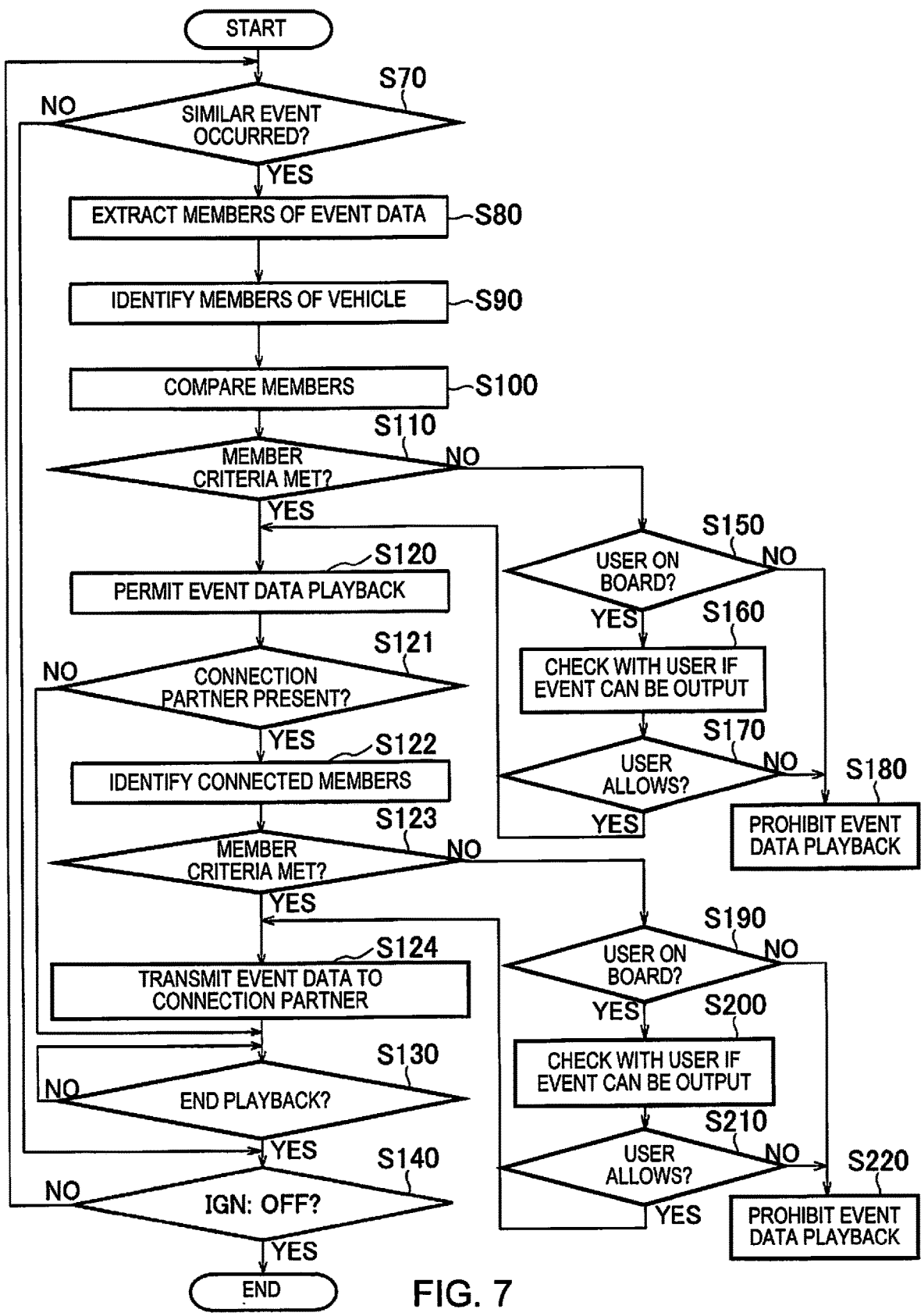
FIG. 7 is a flowchart showing an operation in which the information output device according to the second embodiment outputs event data.

A method with which the information output device shown in FIG. 5 outputs event data will now be described with reference to FIG. 7. The only difference from the first embodiment is the processing of Steps S121 to S124. Therefore, only the processing steps for this difference will be described, and descriptions of the other, common processes will be omitted.

In Step S121, the communication partner identification unit 61 determines whether someone is connected to the vehicle via a communication means. If the communication partner identification unit 61 determines that no one is connected to the vehicle via a communication means (NO in Step S121), the process proceeds to Step S130.

In Step S121, if the communication partner identification unit 61 determines that someone is connected to the vehicle via a communication means (YES in Step S121), the process proceeds to Step S122.

In Step S122, the communication partner identification unit 61 identifies the person connected to the vehicle via a communication means and forwards the identification to the member identification unit 20. The member identification unit 20 can identify, in addition to second members that are in the vehicle, a person that is connected to the vehicle via a communication device, as a second member.

Proceeding to Step S123, the member comparison unit 42 compares the second members that are connected to the vehicle via a communication device with the first members and determines whether the second members that are connected to the vehicle via a communication device include members other than the first members. If the member comparison unit 42 determines that the second members that are connected to the vehicle via a communication device include members other than the first members (NO in Step S123), the process proceeds to Step S190. At the time that the process proceeds to Step S190, the playback approval/rejection determination unit 43 prohibits the automatic output of the event data to the second members that are connected to the vehicle via a communication device. The process from Steps S190 to S220 is the same as the process from Steps S150 to S180 of the first embodiment.

In Step S123, if the member comparison unit 42 determines that the second members that are connected to the vehicle via a communication device do not include members other than the first members (YES in Step S123), the process proceeds to Step S124.

In Step S124, the communication unit 60 transmits the event data to the second members that are connected to the vehicle via a communication device.

As described above, the following actions and effects can be achieved by means of the second embodiment.

The information output device identifies, in addition to the first members that were in the vehicle at the time the event was detected and the second members that are in the vehicle, first members who were connected to the vehicle via a communication device at the time the event was detected and second members that are connected to the vehicle. It is thus possible to determine whether the event data can be output with respect to the second members that are connected via a communication means.

Third Embodiment

Figure 8:
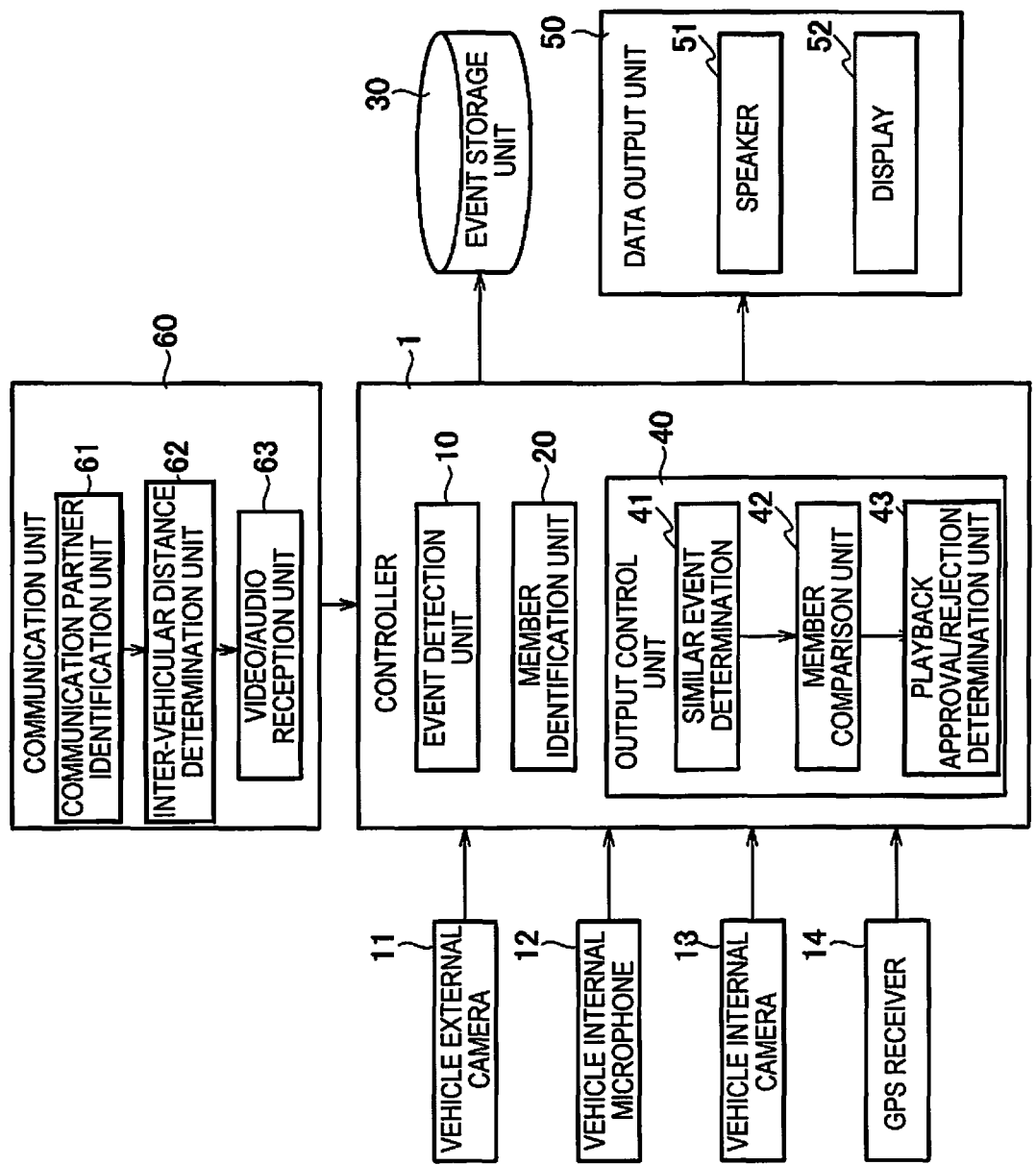
FIG. 8 is a block diagram illustrating the configuration of an information output device according to a third embodiment.

The configuration of the information output device according to a third embodiment will be described with reference to FIG. 8. The only difference from the second embodiment is the configuration of the communication unit 60. Therefore, only the processing executed by the communication unit 60 will be described, and descriptions of the other, common configurations will be omitted.

When it is determined that another vehicle is connected to the vehicle via a communication means and is traveling within a predesignated distance range from the vehicle, the information output device further identifies first members that were in the other vehicle when the event was detected and second members that are in the other vehicle. The communication unit 60 includes the communication partner identification unit 61, an inter-vehicular distance determination unit 62, and a video/audio reception unit 63.

The communication unit 60 transmits, to the other vehicle connected to the vehicle via a communication means, audio data and video data from the inside of the vehicle, and video data from the outside of the vehicle. A specific example of the communication means is Internet communication. It is thus possible for the members (persons) in the other vehicle to perceive the event and view the event data.

The communication partner identification unit 61 determines whether another vehicle is connected to the vehicle via communication means, and identifies the connected other vehicle from the vehicle identification number (VIN), etc., of the other vehicle.

The inter-vehicular distance determination unit 62 determines whether the distance between the vehicle and the other vehicle is within a predesignated distance range. Specifically, the inter-vehicular distance determination unit 62 acquires the distance between the vehicle and the other vehicle measured with a stereo camera or a ranging radar used in autonomous driving devices and driving assistance devices, and determines whether the distance between the vehicle and the other vehicle is within a predesignated distance range.

The video/audio reception unit 63 receives via a communication means video and audio from the inside of the other vehicle that is connected to the vehicle. The video/audio reception unit 63 forwards the video and audio from the inside of the other vehicle that is connected to the vehicle to the member identification unit 20. The member identification unit 20 identifies the occupants in the other vehicle. The information output device can thus identify persons who were in the other vehicle when the event was detected as first members, and identify persons who are in the other vehicle as second members.

Figure 9:
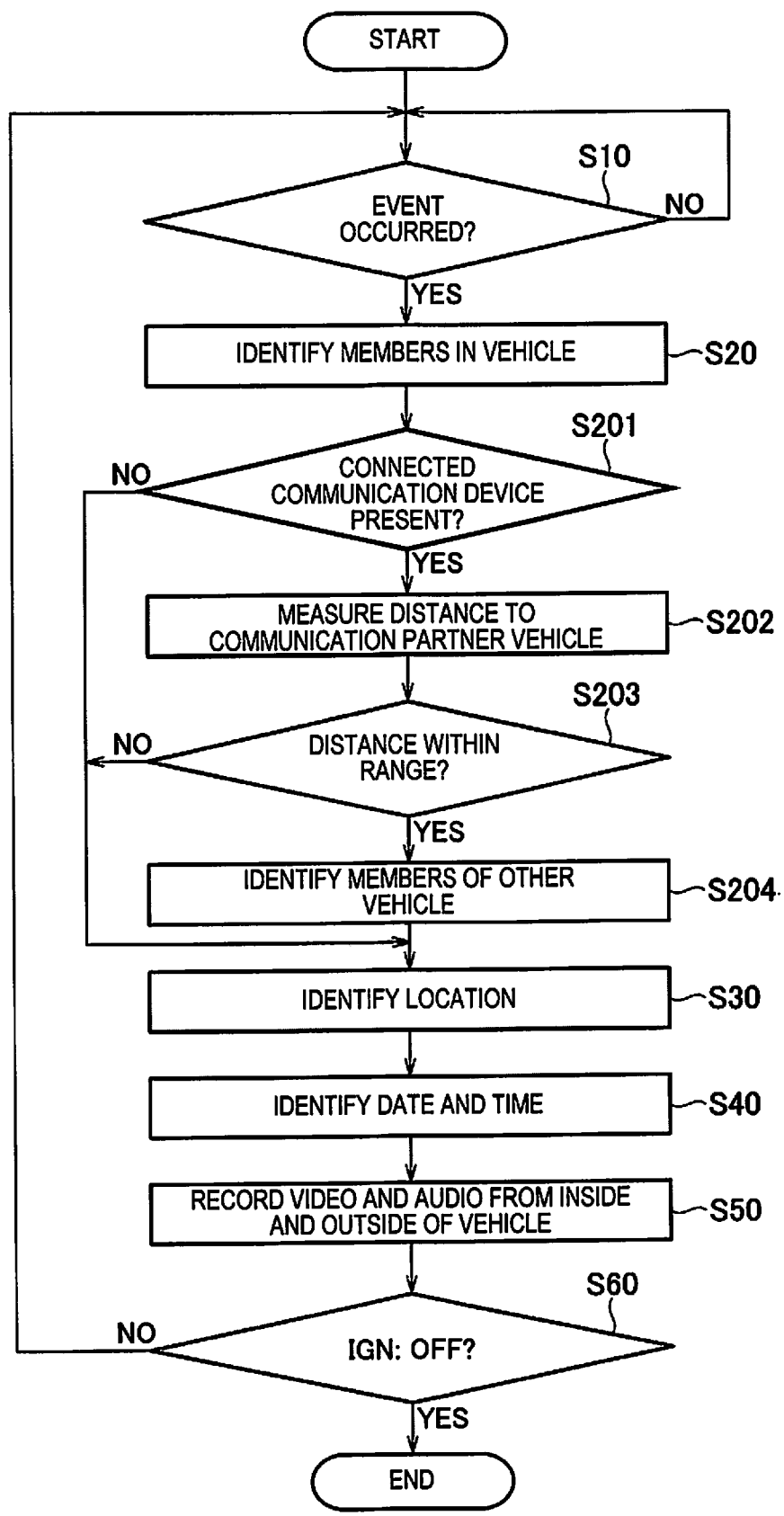
FIG. 9 is a flowchart showing an operation in which the information output device according to the third embodiment stores event data.

A method with which the information output device shown in FIG. 8 stores event data will now be described with reference to FIG. 9. The only difference from the second embodiment is the processing of Steps S201 to S204. Therefore, only the processing steps for this difference will be described, and descriptions of the other, common processes will be omitted.

In Step S201, the communication partner identification unit 61 determines whether there is another vehicle connected to the vehicle via communication means. If the communication partner identification unit 61 determines that no other vehicle is connected to the vehicle via a communication means (NO in Step S201), the process proceeds to Step S30.

In Step S201, if the communication partner identification unit 61 determines that another vehicle is connected to the vehicle via a communication means (YES in Step S201), the process proceeds to Step S202.

In Step S202, the inter-vehicular distance determination unit 62 measures the distance between the vehicle and the other vehicle. The process proceeds to Step S203, and the inter-vehicular distance determination unit 62 determines whether the measured distance between the vehicle and the other vehicle is within a predesignated distance range. If the inter-vehicular distance determination unit 62 determines that the distance to the other vehicle is not within a predesignated distance range (NO in Step S203), the process proceeds to Step S30.

In Step S203, if the inter-vehicular distance determination unit 62 determines that the distance to the other vehicle is within a predesignated distance range (YES in Step S203), the process proceeds to Step S204.

In Step S204, the video/audio reception unit 63 receives, via Internet communication from the other vehicle that is connected to the vehicle, video and audio from the inside of the other vehicle. Then, the video/audio reception unit 63 forwards the received video and audio from the inside of the other vehicle to the member identification unit 20. The member identification unit 20 can thus identify, in addition to the first members that were in the vehicle at the time the event was detected, members who were in the other vehicle at the time the event was detected as first members.

Figure 10:
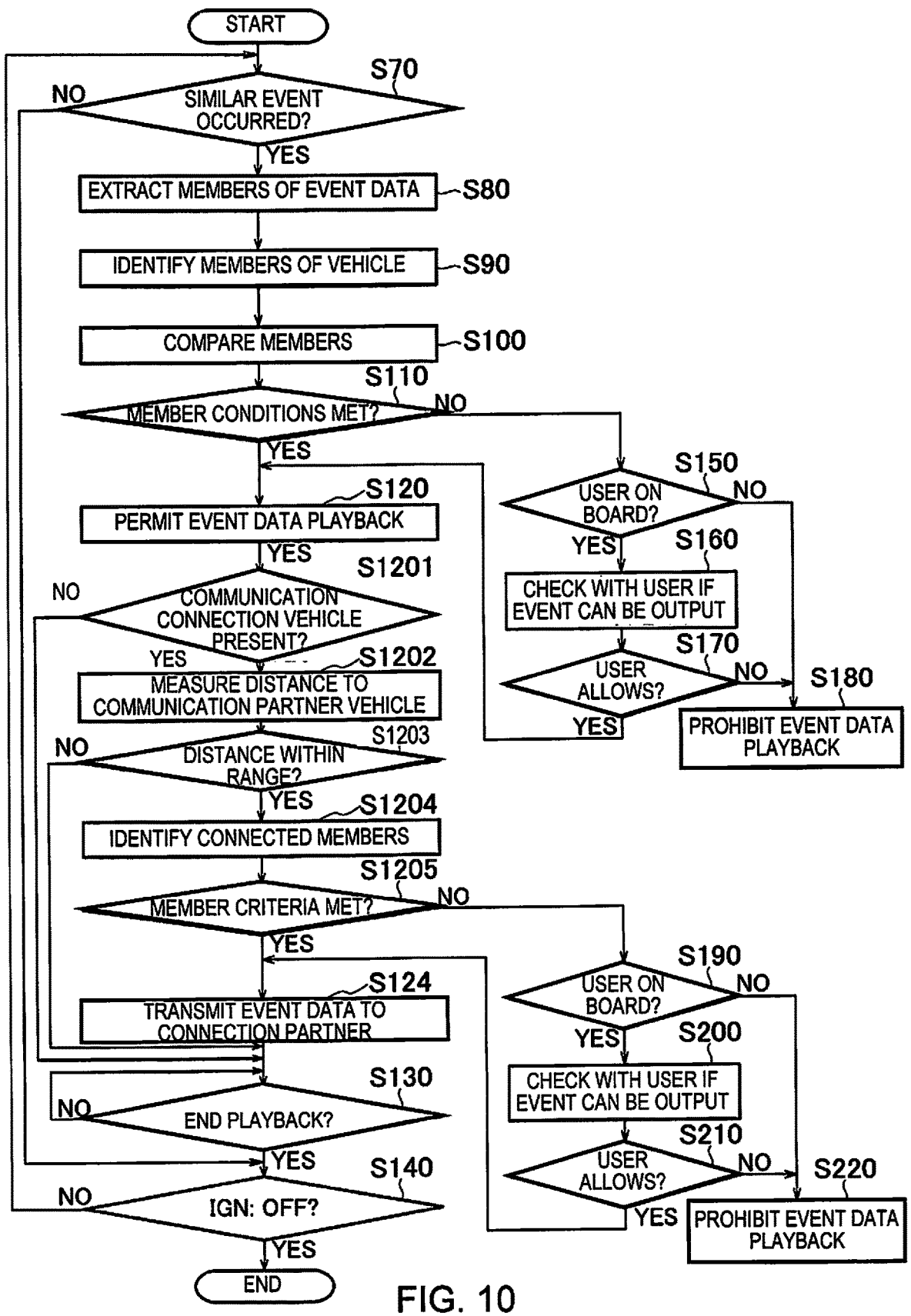
FIG. 10 is a flowchart showing an operation in which the information output device according to the third embodiment outputs event data.

A method with which the information output device shown in FIG. 8 outputs event data will now be described with reference to FIG. 10. The only difference from the second embodiment is the processing of Steps S1201 to S1205. Thus, only the processing steps for this differences will be described, and descriptions of the other, common processes will be omitted.

In Step S1201, the communication partner identification unit 61 determines whether another vehicle is connected to the vehicle via communication means. If the communication partner identification unit 61 determines that another vehicle is not connected to the vehicle via a communication means (NO in Step S1201), the process proceeds to Step S130.

In Step S1201, if the communication partner identification unit 61 determines that there is another vehicle connected to the vehicle via a communication means (YES in Step S1201), the process proceeds to Step S1202.

In Step S1202, the inter-vehicular distance determination unit 62 measures the distance between the vehicle and the other vehicle.

The process proceeds to Step S1203, and the inter-vehicular distance determination unit 62 determines whether the distance between the vehicle and the other vehicle is within a predesignated distance range. If the inter-vehicular distance determination unit 62 determines that the distance to the other vehicle is not within a predesignated distance range (NO in Step S1203), the process proceeds to Step S130.

In Step S1203, if the inter-vehicular distance determination unit 62 determines that the distance between the vehicle and the other vehicle is within a predesignated distance range (YES in Step S1203), the process proceeds to Step S1204.

In Step S1204, the video/audio reception unit 63 receives via a communication means, and forwards to the member identification unit, video and audio from the inside of the other vehicle that is connected to the vehicle. The member identification unit 20 can identify, in addition to the second members that are in the vehicle, second members that are in the other vehicle.

The process proceeds to Step S1205, the member comparison unit 42 compares the second members that are in the other vehicle connected to the vehicle via a communication device with the first members, and determines whether the second members that are in the other vehicle include members other than the first members. If the member comparison unit 42 determines that the second members in the other vehicle include members other than the first members (NO in Step S1205), the process proceeds to Step S190. At the time that the process proceeds to Step S190, the playback approval/rejection determination unit 43 prohibits the automatic output of the event data to the second members that are in the other vehicle. The processing from Steps S190 to S220 is the same as the processing from Steps S150 to S180 of the first embodiment.

In Step S1205, if the member comparison unit 42 determines that the second members of the other vehicle that are connected to the vehicle via a communication device do not include members other than the first members (YES in Step S1205), the process proceeds to Step S124.

As described above, the following actions and effects can be achieved by means of the third embodiment.

The information output device identifies first members and second members that were in the vehicle when the event was detected and second members. Further, if another vehicle is connected to the vehicle via a communication means and is traveling within a predesignated distance range from the vehicle, first members and second members that were in the other vehicle when the event was detected are identified. This allows a determination to be made regarding whether or not to output the event data to the second members that are in the other vehicle. Further, by setting the condition that the other vehicle is traveling within a predesignated distance range from the vehicle, it is possible to determine whether the first members that were in the other vehicle when the event was detected were in a state in which the event could be perceived. Further, if the event data are output, the second members in the other vehicle can understand the reason the event data were output.

Although embodiments of the present invention have been described above, the descriptions and figures that form part of this disclosure should not be understood as limiting the present invention. From this disclosure, various alternative embodiments, examples, and operating techniques should be apparent to those skilled in the art.

The invention claimed is:

1. An information output device comprising:
   a processor and a memory, the memory storing instructions which when executed by the processor perform
   detecting an event occurring inside or outside a vehicle with a vehicle sensor, the vehicle sensor including at least one of a microphone, a camera, and a GPS receiver;
   identifying persons that can perceive the event when the event is detected as a first member;
   storing event data related to the event that was detected in association with the first member;
   automatically outputting the stored event data;
   identifying persons that can view the outputted event data as a second member;
   determining whether the second members include a person other than the first members, and to prohibit automatically outputting the event data upon determining that the second members include a person other than the first members; and
   querying the first members included in the second members regarding whether the event data can be output upon determining that the second members include a person other than the first members and that the second members include at least one person who is the first members, and another event that is similar to the event stored as the event data is detected,
   the another event is determined to be similar to the event stored as the event data when a conversation occurring within the vehicle includes a topic of conversation stored in the event data or when a view visible from inside of the vehicle includes a part of a view stored in the event data.

2. The information output device according to claim 1, wherein the memory storing instructions which when executed by the processor is further configured to perform automatically outputting the event data upon determining that the second members do not include a person other than the first members.

3. The information output device according to claim 1, wherein the memory storing instructions which when executed by the processor is further configured to perform identifying the first members and the second members that were in the vehicle when the event was detected.

4. The information output device according to claim 1, wherein the memory storing instructions which when executed by the processor is further configured to perform identifying, in addition to the first members and the second members that were in the vehicle when the event was detected, the first members and the second members that were communicably connected to the vehicle when the event was detected.

5. The information output device according to claim 1, wherein the memory storing instructions which when executed by the processor is further configured to perform when another vehicle that is different from the vehicle is communicably connected to the vehicle and is traveling within a predetermined distance from the vehicle, identifying, in addition to the first members and the second member that were in the vehicle at a time the event was detected, the first members and the second member that were in the other vehicle at the time the event was detected.

6. The information output device according to claim 1, wherein the memory storing instructions which when executed by the processor is further configured to perform identifying persons that can understand the outputted event data output as the second member.

7. The information output device according to claim 1, wherein the memory storing instructions which when executed by the processor is further configured to perform extracting the event data in which information related to the second members is stored from the stored event data and presenting the data to the second members as a list.

8. The information output device according to claim 7, wherein the memory storing instructions which when executed by the processor is further configured to perform when the event data in which information related to the second members is stored is presented to the second members as a list, calculating a ratio of the second members to the first members stored in each piece of event data to be presented as the list, and presenting each piece of the event data in descending order of the ratio.

9. The information output device according to claim 1, wherein the memory storing instructions which when executed by the processor is further configured to perform automatically outputting the event data upon detecting the another event similar to the event stored as the event data and upon determining that the second members do not include a person other than the first members.

10. An information output method comprising:
   detecting an event occurring inside or outside a vehicle with a vehicle sensor, the vehicle sensor including at least one of a microphone, a camera, and a GPS receiver;
   identifying persons that can perceive the event when the event is detected as a first member;
   storing event data related to the event that was detected in association with the first member; and
   automatically outputting the event data that was stored, characterized by identifying persons that can view the event data to be output as a second member;
   determining whether the second members include a person other than the first members;
   prohibiting automatically outputting of the event data upon determining that the second members include a person other than the first members; and
   querying the first members included in the second members regarding whether the event data can be output upon determining that the second members include a person other than the first members and that the second members include at least one person who is the first members, and another event that is similar to the event stored as the event data is detected,
   the another event is determined to be similar to the event stored as the event data when a conversation occurring within the vehicle includes a topic of conversation stored in the event data or when a view visible from inside of the vehicle includes a part of a view stored in the event data.

* * * * *